(12) United States Patent
Choi

(10) Patent No.: US 6,384,100 B1
(45) Date of Patent: May 7, 2002

(54) GRAFT POLYMERIZATION, SEPARATORS, AND BATTERIES INCLUDING THE SEPARATORS

(75) Inventor: Wai Ming Choi, West Newton, MA (US)

(73) Assignee: Hollingsworth + Vose Company, East Walpole, MA (US)

( * ) Notice: Subject to any disclaimer, the term of this patent is extended or adjusted under 35 U.S.C. 154(b) by 0 days.

(21) Appl. No.: 09/697,962

(22) Filed: Oct. 27, 2000

Related U.S. Application Data

(63) Continuation-in-part of application No. 09/429,820, filed on Oct. 29, 1999, now abandoned.

(51) Int. Cl.$^7$ .......................... C08F 2/50; C08F 255/00; H01M 2/16
(52) U.S. Cl. .............................. 522/46; 522/33; 522/42; 522/44; 522/79; 522/80; 522/85; 429/249
(58) Field of Search ................................ 429/249, 247, 429/250, 254; 252/184; 521/25, 27, 30, 31, 32; 522/46, 48, 60, 74, 79, 80, 78, 85, 116, 120

(56) References Cited

U.S. PATENT DOCUMENTS

| | | |
|---|---|---|
| 3,955,014 A | 5/1976 | Mostev et al. |
| 5,270,137 A | 12/1993 | Kubota |
| 5,425,865 A | 6/1995 | Singleton et al. |
| 5,743,940 A | 4/1998 | Sugo et al. |
| 6,030,727 A | 2/2000 | Tanaka et al. |
| 6,130,008 A | 10/2000 | Yuasa et al. |

FOREIGN PATENT DOCUMENTS

| | | |
|---|---|---|
| JP | 62-253638 | 11/1987 |
| WO | WO 93/01622 | 1/1993 |

*Primary Examiner*—Susan W. Berman
(74) *Attorney, Agent, or Firm*—John C. Purdue; David C. Purdue

(57) ABSTRACT

A method for producing an acrylic graft polymer on the surface of a polyolefin article is disclosed. The method comprises the steps of immersing the polyolefin article in a solution of a photoinitiator in a volatile solvent, allowing the volatile solvent in the photoinitiator solution to vaporize, immersing the polyolefin article in a solution of an acrylic monomer, and subjecting the polyolefin article, while in a suitable atmosphere, which can be air or can be inert, to ultraviolet irradiation to cause the acrylic monomer to graft to the polyolefin surface. A method which involves subjecting a polyolefin article to corona discharge, immersing the article, after corona discharge treatment, in a solution of a photoinitiator and an acrylic monomer in a volatile solvent, and subjecting the article to ultra violet irradiation to cause the acrylic monomer to graft to the polyolefin surface is also disclosed. The latter method improves the ammonia trapping capacity of the grafted article.

15 Claims, No Drawings

GRAFT POLYMERIZATION, SEPARATORS, AND BATTERIES INCLUDING THE SEPARATORS

REFERENCE TO RELATED APPLICATION

This is a continuation in part of U.S. application Ser. No. 09/429,820, filed Oct. 29, 1999, now abandoned.

BACKGROUND OF THE INVENTION

1. Field of the Invention

The present invention relates generally to the field of graft polymerization and, more specifically, to graft polymerization of non-woven polyolefin fiber sheets, and to batteries in which graft polymerized non-woven polyolefin fiber sheets constitute separators which are positioned between the positive and negative plates.

2. Description of the Prior Art

Battery separators which are non-woven sheets of polyolefin fibers with an acrylic graft polymer on the fiber surfaces are known, being disclosed in a paper presented at the 1986 Power Sources Symposium held in Cherry Hill, N.J., J. Polym. Sci. 34, 671 (1959), and in WO 93/01622, published Jan. 21, 1993. The Symposium paper discloses the use of ionizing radiation to produce such separators, while WO 93/01622 discloses a method for producing such separators which involves immersion of non-woven sheets of polyolefin fibers in a solution of an acrylic monomer which also contains a photoinitiator, followed by ultraviolet irradiation of the sheets. Various publications, e.g., Yao and Ranby, *Journal of Applied Polymer Science*, Vol 41, 1469–1478 (1990) disclose work carried out at the Royal Institute of Science, Stockholm, Sweden, which involved immersing polyolefin fibers and films in solutions of acrylic monomers and benzophenone, followed by ultraviolet irradiation of the fibers and films to produce an acrylic graft polymer on the surfaces of the fibers and films. Another publication, *Journal of Polymer Science, Polymer Letters Edition*, Vol. 19, pages 457–462 (1981) discloses the immersion of polyolefin films in an acetone solution of benzophenone and, after drying of the films, vapor phase and liquid phase copolymerization of an acrylic monomer with the polypropylene surfaces of the films to produce acrylic graft polymers.

A Journal article entitled "Chemical Absorptive Properties of Acrylic Acid Grafted Non-woven Battery Separators", refers to work carried out by Leblanc et al. (citing P. Leblanc, Ph. Blanchard, S. Senyarich, Abstract No. 261 ESC/ISE meeting, Paris, (1997) and P. Leblanc, Ph. Blanchard, S. Senyarich, *Electrochem Soc,*. 145, 846, (1998)) as showing that ammonia in a NiMH cell dramatically reduces the self-discharge performance, and cites the latter reference for the statements:

"It was also demonstrated that this effect could be significantly reduced if the free ammonia in the cell could be removed. The tests showed that by using an acrylic acid grafted separator with an ammonia absorption of over $1.5 \times 10^{-4}$ mol/g then all the free ammonia could be eliminated, and the self-discharge performance improved to the levels normally associated with NiCd cells."

The reference then refers to the process of WO 93/01622 as "capable of grafting non-wovens of all constructions" and states:

"A study was carried out to examine the effect of the non-woven type on the separator's ability to absorb ammonia using Kjeldhal's technique (see tablet). All the grafted materials were grafted to the same level using the same grafting conditions. The results show firstly that an acrylic acid graft is necessary for a non-woven to posses the ability to absorb ammonia. Furthermore, the amount of absorption is a function of the base non-woven material. The strongest correlation is with the fibre size of the non-woven, and therefore also surface area, with fine separators absorbing the most ammonia.

"Samples of the PP fine fibre spunbond were also prepared with two different graft levels, and their ammonia absorption measured (see table 2). These results show that the ammonia absorption is independent of the total amount of acrylic acid grafted onto the polymer backbone, and is further evidence that it is the base non woven which controls the degree of ammonia absorption."

THE INSTANT INVENTION

The instant invention is based upon the discovery that a non-woven sheet of polyolefin fibers can be immersed in a solution of benzophenone, dried, immersed in a solution of acrylic acid, and subjected to ultraviolet irradiation, while the acrylic acid solution is still on its surfaces, to produce an acrylic graft copolymer on the surfaces of the fibers, and that the reaction proceeds more rapidly than when the non-woven sheet of polyolefin fibers is immersed in a solution of benzophenone and acrylic acid, and subjected to ultraviolet irradiation while the solution of acrylic acid and benzophenone is still on the surfaces of the fibers.

In a further aspect, the invention is based upon the discovery that a non-woven sheet of polyolefin fibers can be immersed in a solution of benzophenone, dried, immersed in a solution of acrylic acid, and subjected to ultraviolet irradiation, while the acrylic acid solution is still on its surfaces, and while the non-woven sheet with the acrylic acid solution on its surfaces is in contact with either air or an inert atmosphere, to produce an acrylic graft copolymer on the surfaces of the fibers.

In a still further aspect, the invention is based upon the discovery that a non-woven sheet of polyolefin fibers can be immersed in a solution of benzophenone, dried, immersed in a solution of acrylic acid, and subjected to ultraviolet irradiation, while the acrylic acid solution is still on its surfaces, and while the non-woven sheet with the acrylic acid solution on its surfaces is inside a polyethylene bag or tube, and is in contact either with air or with an inert atmosphere, to produce an acrylic graft copolymer on the surfaces of the fibers. In a preferred embodiment, after the volatile solvent in the photoinitiator solution vaporizes, a web of the polyolefin article is advanced through the solution of the acrylic monomer, and through a region where it is subjected to ultraviolet irradiation to cause the acrylic monomer to graft to the polyolefin surface, and sheets of a polyolefin such as polyethylene which are wider than the web are introduced above and below the web and the adjacent edges of the polyolefin sheets are sealed to one another to form a tube which surrounds the web, and it is the web surrounded by this tube which is advanced through the region where the web is subjected to ultraviolet irradiation.

In yet another aspect, the invention is based upon the discovery that the ammonia absorption capacity of a non-woven sheet composed of polyolefin fibers which have been graft polymerized with acrylic acid can be increased significantly by subjecting the sheet to corona discharge before the fibers are graft polymerized with acrylic acid.

In still another aspect, the invention is based upon the discovery of a method for producing a non-woven sheet of polyolefin fibers which is hydrophilic in at least one part and hydrophobic or hydrophilic to a different degree in at least one part. The sheet which is hydrophilic in at least one part and hydrophobic in at least one part can be produced by applying a solution of benzophenone or of another photoinitiator to a selected part or to selected parts of a non-woven sheet composed of polyolefin fibers, immersing the sheet, after evaporation of the solvent from the benzophenone or the like solution thereon, in an acrylic acid solution, removing the sheet from the acrylic acid solution, and irradiating the resulting sheet with ultra violet; the irradiation causes the acrylic acid to graft polymerize to the surfaces of the fibers where the benzophenone or the like solution was applied, making them hydrophilic, but does not cause graft polymerization to the surfaces of the fibers where benzophenone or the like was not applied, so that they remain hyrdrophobic. The sheet which is hydrophilic in at least one part and hydrophilic to a different degree in at least one part can be produced by applying a solution of benzophenone or of another photoinitiator to a selected part or to selected parts of a non-woven sheet composed of polyolefin fibers, applying a solution having a different concentration of benzophenone or of another photoinitiator to a different selected part or to different selected parts, immersing the sheet, after evaporation of the solvent from the benzophenone or the like solutions thereon, in an acrylic acid solution, removing the sheet from the acrylic acid solution, and irradiating the resulting sheet with ultra violet; the irradiation causes the acrylic acid to graft polymerize to the surfaces of the fibers where the benzophenone or the like solution was applied, making them hydrophilic, but the degree to which graft polymerization to the surfaces of the fibers makes them hydrophilic depends upon the concentration of the benzophenone or the like in the solution which was applied. When a recombinant battery is assembled in which non-woven sheets of polyolefin fibers which are hydrophobic in parts and hydrophilic in parts are used as a separator between adjacent plates, the hydrophilic portions of the sheets are wet by the electrolyte, but the hydrophobic portions are not. As a consequence, portions of the plates are wet by the electrolyte, which saturates adjacent portions of the separator, but gas evolved at one of the plates is free to migrate through the hydrophobic portions of the separator to an adjacent one of the plates.

Non-woven sheets of polyolefin fibers which can be used as starting materials in practicing the instant invention are produced commercially by numerous processes which have been classified as "dry-laid systems" and as "melt spun systems". Recognized "dry-laid systems are known as "random air laid", as "carded web systems" and as "spun lace systems", while recognized "melt spun systems" are known as "spunbonded" and "melt blown processes. These methods are all well known, and are disclosed in the literature, e.g., in "Introduction to Nonwovens", Albin Turbak, TAPPI Press, Atlanta, Ga., 1998 (see, in particular, pages 32–39).

OBJECTS OF THE INVENTION

It is, therefore, an object of the invention to provide an improved method for producing a graft polymer on the surfaces of polyolefin fibers and films.

It is another object to provide an improved method for producing an acrylic graft polymer on the surfaces of polyolefin fibers and films.

It is a further object to provide a method for producing a non-woven sheet of polyolefin fibers which has at least one region in which the fibers are hydrophilic as a consequence of an acrylic acid graft polymer on fiber surfaces and at least one region in which the fibers are hydrophobic.

It is still a further object to provide a non-woven sheet of polyolefin fibers which has at least one region in which the fibers are hydrophilic as a consequence of an acrylic acid graft polymer on fiber surfaces and at least one region in which the fibers are hydrophobic.

Other objects and advantages will be apparent from the description which follows, which is intended only to illustrate and disclose, and not to limit, the invention.

DISCLOSURE OF THE PREFERRED EMBODIMENTS

In the following Examples, and elsewhere herein, the terms "percent" and "parts" refer to percent and parts by weight, unless otherwise indicated, and "g" means gram or grams, "ml" mean milliliter or milliliters, "m" means meter or meters, "cm" means centimeter or centimeters, "mm" means millimeter or millimeters, "$\mu$m" means micrometer or micrometers, "KV" means kilovolts, "KW" means kilowatts.

EXAMPLE 1

A sample of a non-woven fabric which is commercially available under the designation "TR1827E1" was immersed in a solution of 15 g benzophenone in 285 g acetone, was removed from the solution, and was allowed to stand under ambient conditions of about 25° C. for five minutes until the acetone evaporated. The fabric sample was approximately 5 inches (12.7 cm) by 30 inches (76.2 cm) and 0.007 inch (0.178 mm) thick; its average unit area weight was 50 g per $m^2$; it was composed of 40 percent of polypropylene fibers having an average diameter of 12 $\mu$m and 60 percent of sheath core fibers having an average diameter of 16 $\mu$m, and composed of a polypropylene core enclosed within a polyethylene sheath. The fabric sample was then immersed in an aqueous solution which contained 35 percent of acrylic acid, and was placed inside a polyethylene bag. Nitrogen was then introduced into the bag to purge the air that was originally present therein, and to establish a nitrogen atmosphere inside the bag. The bag was then closed, and was moved under a UV lamp which was 8 inches (20.3 cm) in length at a speed of 8 to 10 feet per minute (2.44 to 3.05 m per minute). The distance from the UV source to the sample surface ranged from 4⅞ inches to 5½ inches. The sample was then removed from the polyethylene bag. After the grafting which occurred during the procedure described above, three samples were found to have gained an average 17.5 percent in weight, and to have an average ion exchange capacity in meq.$g^{-1}$ of 0.689.

For purposes of comparison, but not in accordance with the instant invention, the procedure of Example 1 was repeated, except that the step of immersing the non-woven fabric sample in an acetone solution of benzophenone was omitted, and, instead, the fabric, as received, was immersed in a solution composed of 35 percent of acrylic acid, 63.6 percent of $H_2O$, 0.5 percent of a surfactant that is commercially available under the designation "Triton X100", and 0.85 percent of benzophenone. After the grafting which occurred during the procedure described above, two samples were found to have gained an average of 13.2 percent in weight, and to have an average ion exchange capacity in meq.g–1 of 0.291.

EXAMPLE 2

The procedure described in Example 1 was repeated, except that the solution in which the fabric sample was immersed, after it was removed from the benzophenone solution in acetone and allowed stand until the acetone evaporated, contained 35 percent of acrylic acid, 64.5 percent of water, and 0.5 percent of the surfactant which is available under the designation Triton X100. After the grafting, two samples were found to have gained an average 18.15 percent in weight, and to have an average ion exchange capacity in meq.g$^{-1}$ of 0.641.

EXAMPLE 3

The procedure described in Example 1 was also repeated, except that the sample was immersed in a 5 percent solution of benzophenone in methylene chloride. After the methylene chloride evaporated, the sample was immersed in the aqueous solution which contained 35 percent of acrylic acid, and was placed inside the polyethylene bag and, after a nitrogen atmosphere was established inside the bag and the bag was closed, was moved under the UV lamp. After the grafting, two samples which were exposed to the UV irradiation for 15 seconds were found to have gained an average of 19.4 percent in weight, and to have an average ion exchange capacity in meq.g$^1$ of 0.542. A sample which was exposed to UV irradiation for 10 seconds was found to have gained 10.42 percent in weight, and to have an ion exchange capacity in meq.g$^{-1}$ of 0.251.

EXAMPLE 4

Samples which were approximately 5 inches (12.7 cm) by 30 inches (76.2 cm) and 0.007 inch (0.178 mm) thick of various non-woven fabrics other than that which is available under the designation "TR1827E1" have been treated by a procedure similar to that described in Example 1, differing in that the fabrics were immersed in a solution containing 5 g benzophenone in 150 g methanol, the acrylic acid solution in which the fabrics were immersed was composed of 90 g acrylic acid, 3 g methanol and 207 g water, and the polyethylene bags in which the fabric samples were placed after having been immersed in the acrylic acid solution were not purged with nitrogen so that there was air in contact with the fabric samples during irradiation with UV. The fibers in the fabrics that were treated were polypropylene fibers having an average diameter of 12 μm ("PP fibers"), and sheathcore fibers composed of a polypropylene core and a polyethylene sheath, average diameter 16 μm ("PE/PP fibers").

Non-woven webs were produced by opening bales of the fibers identified above, carding the fibers, and bonding the carded fibers to one another at points of contact in a flow through type air oven maintained at a temperature sufficiently high that the fibers bind to one another, but not so high that sticking occurs. This temperature is usually in the range of 120 to 126° C., but the precise temperature required in any given case can be determined with simple experimentation. The webs were composed of the PE/PP fibers identified above, in the proportions indicated in the following table, where the term "Drylaid" refers to webs produced as described, and the term "Spunlace" refers to such webs and to wet laid webs which have been subjected to hydroentanglement by high velocity water jets, for example, using equipment known to those skilled in the art, and referred to as "Fleissner-Aquajet" apparatus. Representative ones of the non-woven polyolefin fabrics that were treated with benzophenone and acrylic acid solutions and then irradiated with ultra violet as described above are identified in the following table.

| Fabric designation | Fiber composition | Weight, g/m$^2$ | Surface Sizing on fiber web |
|---|---|---|---|
| Drylaid, 50 | 35 percent PP fibers and 65 percent PE/PP fibers | 50 | Yes |
| Drylaid 60 | 35 percent PP fibers and 65 percent PE/PP | 60 | Yes |
| SMS | PP fibers | 47 | None |
| Spunlace | PE/PP fibers | 41 | None |
| Drylaid/meltblown Composite | 35 percent PP fibers and 65 percent PE/PP fibers in a first layer, which was drylaid, and meltblown PP fibers in a second layer | 54 | See note, below |
| Meltblown, 50 | PP fibers | 50 | None |

The basis weights (Weight, g/m$^2$) given in the foregoing table are nominal values for the Drylaid and Meltblown materials, are based upon actual determinations for the SMS, Spunlace and Drylaid/Meltblown Composite materials.

The drylaid/meltblown composite identified in the foregoing table was produced by depositing meltblown PP fibers on top of a drylaid sheet composed of PP fibers and PE/PP fibers; there was a surface size on the fibers of the dry laid sheet, but not on the meltblown PP fiber portion of the material.

The material designated "SMS" in the foregoing table is composed of three layers, two of a known material called "spunbond" and an intermediate "Meltblown" layer.

The results achieved in Example 4 are summarized in the following table, Where "IEC" means the ion exchange coefficient of the grafted sheet in milliequivalents per gram:

| Fabric Designation | Initial Weight, g | Weight, g, After immersion In benzophenone | Weight, g, After Grafting | IEC |
|---|---|---|---|---|
| Drylaid, 50 | 4.18 | 4.45 | 4.56 | 0.126 |
| Drylaid 60 | 4.96 | 5.32 | 5.57 | 0.183 |
| SMS | 4.51 | 5.02 | 5.22 | 0.56 |
| Spunlace | 4.07 | 4.95 | 4.43 | 0.086 |
| Drylaid/meltblown Composite | 4.09 | 4.35 | 4.86 | 0.514 |
| Meltblown, 50 | 4.44 | 5.06 | 6.09 | 1.249 |

EXAMPLE 5

The Drylaid and Spunlace webs produced as described above were subjected to corona discharge at a power level of 0.8 KW by advancing them at a speed of about 10 yards per minute over a grounded roll and beneath metal shoes which were charged by alternating current and were spaced a fraction of an inch above the webs. The apparatus used to subject the Drylaid and Spunlace webs to corona discharge is commercially available from Corotec Corporation, Collinsville, Conn., under the designation "HFT-10.

The webs were then immersed in a 35 percent aqueous solution of acrylic acid which also contained 0.8 percent of benzophenone and placed in polyethylene bags. Nitrogen was used to purge air from the bags, and the bags were sealed with a nitrogen atmosphere inside in contact with the webs. The sealed bags were then moved under a 300 watt UV lamp so that the major surfaces of the webs were about 5 inches from the lamp, inverted, and moved under the lamp a second time with the web surfaces about 5 inches from the lamp. This procedure subjected each major surface of each web to UV irradiation for about 10 seconds to cause graft polymerization of the acrylic acid to the fiber surfaces.

Drylaid and Spunlace webs which had not been subjected to corona discharge were also immersed in the 35 percent aqueous solution of acrylic acid which also contained 0.8 percent of benzophenone and placed in polyethylene bags. Nitrogen was used to purge air from the bags, and the bags were sealed with a nitrogen atmosphere inside in contact with the webs. The sealed bags were then moved under a 300 watt UV lamp, using the procedure described in the previous paragraph, so that each major surface of each web was subjected to V irradiation for about 10 seconds to cause graft polymerization of the acrylic acid to the fiber surfaces.

The ion exchange coefficient and the ammonia absorption of the separator were then determined for the separator which had been subjected to corona discharge prior to graft polymerization with acrylic acid and for the separator which had not been so subjected prior to graft polymerization. The ion exchange coefficient was determined in milliequivalents per gram of separator, while the ammonia absorption was determined in mole $NH_4$ per gram of separator on the basis of a Kjeldhal determination of the total nitrogen in the separator after it had been in contact with an electrolyte which contained ammonia. The results of this testing are summarized in the following table:

| Sample | Ion exchange coefficient | Ammonia absorption | Percent increase in ammonia absorption with corona discharge treatment |
|---|---|---|---|
| Spunlace, with corona discharge treatment | 0.175 | 0.0004567 | 14.00 |
| Drylaid, with corona discharge treatment | 0.605 | 0.0004601 | 16.84 |
| Spunlace, without corona discharge treatment | 0.194 | 0.0004006 | . . . |
| Drylaid, without corona discharge treatment | 0.588 | 0.0003938 | . . . |

It will be appreciated that the production of Spunlace and Drylaid webs, their treatment by corona discharge, and their graft polymerization with an acrylic monomer lend themselves to a continuous process.

The hydroentanglement technique used as described above to produce Spunlace webs also lends itself well to the production of non-woven fabrics having a high surface area. For example, fibers composed of a plurality of alternate polyethylene and polypropylene segments, say four polyethylene and four polypropylene segments, are available, having been produced by extrusion. Such fibers can be used to produce either drylaid or wetlaid, non-woven fabrics, and the fabrics can be subjected to hydroentanglement, as described, which separates the segments from one another, greatly increasing the surface area of the fibers in the fabrics, and the surface area of non-woven fabrics having acrylic graft polymers on their surfaces which can be produced therefrom. By way of example, the fibers of a non-woven fabric made from 3 denier fibers composed of eight polyethylene and eight polypropylene segments, after having been subjected to hydroentanglement, can have a denier of about 0.1875 or less.

EXAMPLE 6

Rotary screen coating is used to apply, in a desired pattern, a solution containing 5 g benzophenone in 150 g methanol to one of the surfaces of the sheets of the Spunlace and of the Drylaid material described above. The benzophenone solution is sprayed from inside a cylindrical screen of the coating apparatus onto a first major surface of the Spunlace and Drylaid sheets, which are approximately 5 inches. (12.7 cm) by 30 inches (76.2 cm) and 0.007 inch (0.178 mm) thick as they pass between the cylindrical screen and a roller which is adjacent the screen, passing through openings in the screen. The sheets are then stacked on a screen support, and allowed to stand until the methanol in the benzophenone solution evaporates, and are then immersed in an acrylic acid solution which is composed of 90 g acrylic acid, 3 g methanol and 207 g water, and are conveyed through a chamber having an air atmosphere where they are irradiated for 5 seconds on each side with ultra violet from a source having an output of 400 watts per inch. The cylindrical screen has circular openings extending therethrough in a regular pattern which provide an open area which constitutes 30 percent of the area of the inside of the screen. The apparatus is described in Chapter 5, entitled "Rotary Screen Coating", pages 81 and following, of a book entitled "Web Processing and Converting Technology and Equipment", published by VanNostrand and Reinhold, New York, N.Y. 10020, 1994, ISBN 0442281773.

EXAMPLE 7

The procedure described in Example 6 is repeated, except that the webs, after the coating is applied to the first major surface of the Spunlace and Drylaid webs, as described, is advanced between a second cylindrical screen and a second roller, and a different benzophenone solution is sprayed through the second cylindrical screen onto the second major surface thereof. In a specific embodiment, the benzophenone solution sprayed onto the second major surface of the webs contains 3 g benzophenone in. 150 g methanol, and the second cylindrical screen has circular openings extending therethrough in a regular pattern which provide an open area which constitutes 30 percent of the area of the inside of the screen, and is indexed so that the regions of second major surfaces of the webs to which the benzophenone solution is applied do not overlie the regions of the first major surfaces of the webs to which the benzophenone solution is applied.

EXAMPLE 8

A web of the previously identified non-woven fabric which is commercially available under the designation "TR1827E1" is impregnated with a solution of benzophenone in methanol which contains about 3.2 percent of benzophenone, and passed through an oven which is maintained at about 80° C. to vaporize the methanol. The web, with benzophenone on the fibers thereof, is then advanced through an aqueous acrylic acid solution containing 35 percent of acrylic acid and 2 percent of methanol and between sources, above and below the web, for ultraviolet irradiation which are about five inches from the web and have an output of 400 watts per inch. Each side of the web is exposed to this ultraviolet irradiation for a total of about 5 seconds. After the web leaves the acrylic acid impregnating tank, polyethylene sheets which are wider than the web are introduced thereabove and therebelow, and the adjacent edges of the polyethylene sheets are heat sealed together to form a tube which surrounds the web. After the ultraviolet irradiation of the tub and web, the polyethylene tube is slit, vapors which were confined inside the tube are recovered, and a roll of the web of non-woven polyolefin fibers with an acrylic graft copolymer on the fiber surfaces is collected.

Batteries in which separator produced as described in Example 6 is positioned between positive and negative electrodes has separator regions which are hydrophilic and regions which are hydrophobic, so that there is electrolyte absorbed by the separator in some regions, adjacent the plates, as required to make the batteries operable, but there is no electrolyte in other regions of the separator; as a consequence, gases released at one electrode can pass freely into contact with the other electrode for recombination, and the hydrophobic/hydrophilic nature of the separator can be tailored by varying the proportions of the two regions to the performance characteristics desired in the battery. Even more tailoring is possible in separator produced by the method of Example 7, and the separator can be matched to the differing needs of positive and negative plates.

It will be appreciated that various changes and modifications of the invention as specifically disclosed above are possible without departing from the spirit and scope thereof as defined in the following claims and that, in its essential details, one embodiment thereof is a method for producing an acrylic graft polymer on the surface of a polyolefin article. The method comprises the steps of immersing the polyolefin article in a solution of a photoinitiator in a volatile solvent, allowing the volatile solvent in the photoinitiator solution to vaporize from the polyolefin article, immersing the polyolefin article in a solution of an acrylic monomer, and subjecting the polyolefin article to ultraviolet irradiation to cause the acrylic monomer to graft to the polyolefin surface. The polyolefin article can be subjected to ultraviolet irradiation while in an inert atmosphere, or while in contact with air; it is preferably carried out while the article is in a closed chamber so that vapors formed during irradiation are confined, do not contaminate the work area, and can be scrubbed from air or an inert atmosphere removed from the closed chamber.

The preferred photoinitiators are benzophenone and anthraquinone, although benzoyl peroxide, ethyl-phenyl ketone, aceto-phenone, n-propyl phenyl ketone, isopropyl phenyl ketone, n-butyl phenyl ketone and iso-butyl phenyl ketone and the like can also be used.

In the foregoing examples, acetone, methylene chloride and methanol were used as solvents for benzophenone, So far as is known, the identity of the solvent is not important, so long as it has a sufficiently high partial pressure that it evaporates in a comparatively short time, and is inert to the benzophenone or other photoinitiator.

Acrylic acid is grafted to polyolefin surfaces in the procedures described in the foregoing examples. Equivalent amounts of methactylic acid, acrylamide and other acrylic monomers can also be used, as can, in the language of WO 93/01622, equivalent amounts of a vinyl monomer capable of reacting with an acid or a base to form a salt directly or indirectly so that the product of the reaction can function as an ion exchange material.

Reference has been made herein to sheathcore fibers, particularly ones comprising a polypropylene core and a polyethylene sheath. It will be appreciated that the sheath and the core of these fibers can be concentric or eccentric and that, in the former case, the sheath effectively surrounds the core while, in the latter, a region of the core may be exposed along one side, and the proportion of exposed core will vary, depending upon the degree of eccentricity.

When UV irradiation in the process of the instant invention is carried out in an inert atmosphere, nitrogen, as is indicated by the foregoing examples, is satisfactory, but other gases can also be used, for example, helium, neon, argon, xenon and radon, hydrocarbons such as methane, hydrogen and the like. There is, however, no advantage to using helium, neon, argon, xenon and radon, so their greater expense is not warranted or to using hydrocarbons, hydrogen and the like, so there is no reason to run the risk caused by their susceptibility to combustion and explosion.

In another embodiment, the instant invention also involves forming fibers from a polyolefin and a photoinitiator, and then immersing the fibers in a solution of an acrylic or the like monomer and subjecting the fibers to UV irradiation while the acrylic acid or the like monomer solution is on their surfaces.

In still another embodiment, the invention involves forming fibers from a polyolefin, applying an otherwise conventional sizing composition which contains benzophenone, acetophenone or the like photoinitiator to the fibers, and then immersing the fibers in a solution of an acrylic or the like monomer an subjecting the fibers to UV irradiation or to ionizing radiation while the acrylic or the like monomer solution is on their surfaces.

In yet another embodiment, the invention involves using a plasma to effect graft polymerization of an acrylic or the like monomer with polyolefin fibers, for example, by introducing the fibers to be graft polymerized into an argon or helium plasma to form free radicals on the fiber surfaces and then bringing an acrylic or the like monomer into contact with the free radicals on the fiber surfaces.

In a further embodiment, the invention involves introducing the polyolefin fibers into a plasma and varying the gas and plasma conditions to make the fiber surfaces hydrophilic.

In another embodiment, the invention involves introducing an acrylic monomer into a plasma to cause it to undergo polymerization, and introducing polyolefin fibers into the plasma so that their surfaces contact and adhere to the polymer.

In still a further embodiment, the invention involves treating a non-woven sheet of polyolefin fibers with a plasma to generate active sites, vaporizing an acrylic monomer or oligomer, feeding the vaporized monomer or oligomer through a slot die and into contact with the non-woven sheet so that the monomer or oligomer condenses on the surfaces of the polyolefin fibers, and exposing the monomer or oligomer on the polyolefin fiber surfaces to electron beam or ultraviolet radiation to cure the monomer or oligomer on the fiber surfaces.

Various changes and modifications can be made from the specific details of the invention as disclosed herein without departing from the spirit and scope thereof as set forth in the following claims.

I claim:

1. A method for producing an acrylic graft polymer on the surface of a polyolefin article which is, a non-woven fabric composed of polyolefin file, said method consisting essentially of the steps of immersing the polyolefin article in a solution of a photoinitiator in a volatile solvent, allowing the volatile solvent in the photoinitiator solution to vaporize, immersing the polyolefin article in a solution of an acrylic monomer, removing the polyolefin article from the acrylic monomer solution, and subjecting the polyolefin article to ultraviolet irradiation to cause the acrylic monomer to graft to the polyolefin surface.

2. A method as claimed in claim 1 in which the photoinitiator is benzophenone.

3. A method as claimed in claim 2 in which the benzophenone photoinitiator is dissolved in acetone.

4. A method as claimed in claim 3 in which the acrylic monomer is acrylic acid.

5. A method as claimed in claim 2 in which the benzophenone photoinitiator is dissolved in methanol.

6. A method as claimed in claim 5 in which the acrylic monomer is acrylic acid.

7. A method as claimed in claim 1 in which the polyolefin article, when subjected to ultraviolet irradiation to cause the acrylic monomer to graft to the polyolefin surface, is in an atmosphere of air.

8. A method as claimed in claim 1 in which the polyolefin article, when subjected to ultraviolet irradiation to cause the acrylic monomer to graft to the polyolefin surface, is in an inert gas atmosphere.

9. A method as claimed in claim 1 wherein, after the volatile solvent in the photoinitiator solution vaporizes, a web of the polyolefin article is advanced through a solution of an acrylic monomer, and through a region where it is subjected to ultraviolet irradiation to cause the acrylic monomer to graft to the polyolefin surface, and sheets of a polyolefin which are wider than the web are introduced above and below the web and the adjacent edges of the polyolefin sheets are sealed to one another to form a tube which surrounds the web, and it is the web surrounded by the tube which is advanced through the region where the web is subjected to ultraviolet irradiation.

10. A method as claimed in claim 9 wherein the polyolefin sheets which are introduced above and below the web are polyethylene sheets.

11. A method for producing an acrylic graft polymer on the surface of a polyolefin article, said method comprising the steps of subjecting the polyolefin article to corona discharge, immersing the article, after corona discharge treatment, in a solution of a photoinitiator and an acrylic monomer in a volatile solvent, and subjecting the polyolefin article to ultraviolet irradiation to cause the acrylic monomer to graft to the polyolefin surface.

12. A method as claimed in claim 11 in which the polyolefin article is a non-woven fabric comprising polyolefin fibers.

13. A method as claimed in claim 12 in which the polyolefin article, after having been immersed in the solution of a photoinitiator and an acrylic monomer, is in an inert atmosphere during ultra violet irradiation.

14. A non-woven sheet of polyolefin fibers having an acrylic graft polymer on the surfaces of the fibers of the sheet, said sheet having been produced by a method which comprises the steps of subjecting a non-woven sheet of polyolefin fibers to corona discharge, immersing the article, after corona discharge treatment, in a solution of a photoinitiator and an acrylic monomer in a volatile solvent, and subjecting the polyolefin article to ultraviolet irradiation to cause the acrylic monomer to graft to the polyolefin surface, said sheet of polyolefin fibers having an increased ammonia trapping capacity by comparison with an identical sheet produced by the same method, but without the corona discharge treatment.

15. In a metal hydride battery comprising a plurality of plates, suitable electrical connections, an electrolyte, and a separator between adjacent ones of said plates and a case, the improvement wherein the separator is a non-woven sheet of polyolefin fibers having an acrylic graft polymer on the surfaces of the fibers of the sheet, said sheet having been produced by a method which comprises the steps of subjecting a non-woven sheet of polyolefin fibers to corona discharge, immersing the article, after corona discharge treatment, in a solution of a photoinitiator and an acrylic monomer in a volatile solvent, and subjecting the polyolefin article to ultraviolet irradiation to cause the acrylic monomer to graft to the polyolefin fiber surfaces, said sheet of polyolefin fibers having an increased ammonia trapping capacity by comparison with an identical sheet produced by the same method, but without the corona discharge treatment.

* * * * *

UNITED STATES PATENT AND TRADEMARK OFFICE
CERTIFICATE OF CORRECTION

PATENT NO.   : 6,384,100 B1
DATED        : May 7, 2002
INVENTOR(S)  : Wai Ming Choi It is certified that error appears in the above-identified patent and that said Letters Patent is hereby corrected as shown below:

Column 7,
Line 12, "V" should be -- UV --

Column 10,
Line 55, the word "file" should read -- fibers --

Signed and Sealed this

Twenty-ninth Day of October, 2002

Attest:

JAMES E. ROGAN
Attesting Officer   Director of the United States Patent and Trademark Office